United States Patent [19]

Jacquier

[11] Patent Number: 4,776,072
[45] Date of Patent: Oct. 11, 1988

[54] PROCESS FOR EXTRACTING A SECTION OF A HEAT-EXCHANGER TUBE

[75] Inventor: Paul Jacquier, Tassin La Demi-Lune, France

[73] Assignee: Framatome, Courbevoie, France

[21] Appl. No.: 939,832

[22] Filed: Dec. 9, 1986

[30] Foreign Application Priority Data

Dec. 18, 1985 [FR] France ................. 8518784

[51] Int. Cl.$^4$ ............................... B21D 53/02
[52] U.S. Cl. .......................... 29/157.3 L; 29/426.5; 29/458; 29/727
[58] Field of Search ............. 29/157.3 L, 402.08, 29/402.03, 426.5, 426.1, 426.2, 458, 235, 237, 726, 727; 138/97; 156/344, 294

[56] References Cited

U.S. PATENT DOCUMENTS 3,831,413 8/1974 Glatthorn .................. 72/59

Primary Examiner—P. W. Echols
Assistant Examiner—Irene Cuda
Attorney, Agent, or Firm—Pollock, Vande Sande & Priddy

[57] ABSTRACT

A sleeve (8) is introduced inside the tube (3) from the face (1a) of the tube plate, with which the tube (3) is flush, through the entire length of the tube plate (1). The tube (3) and the sleeve (8) are joined together in two zones (15, 16) by means of a binder which ensures a bond of high mechanical strength. An axial pull is exerted on the sleeve (8) from the face (1a) of the tube plate (1). The device is capable of pulling on the sleeve which operates either continuously or in steps.

7 Claims, 4 Drawing Sheets

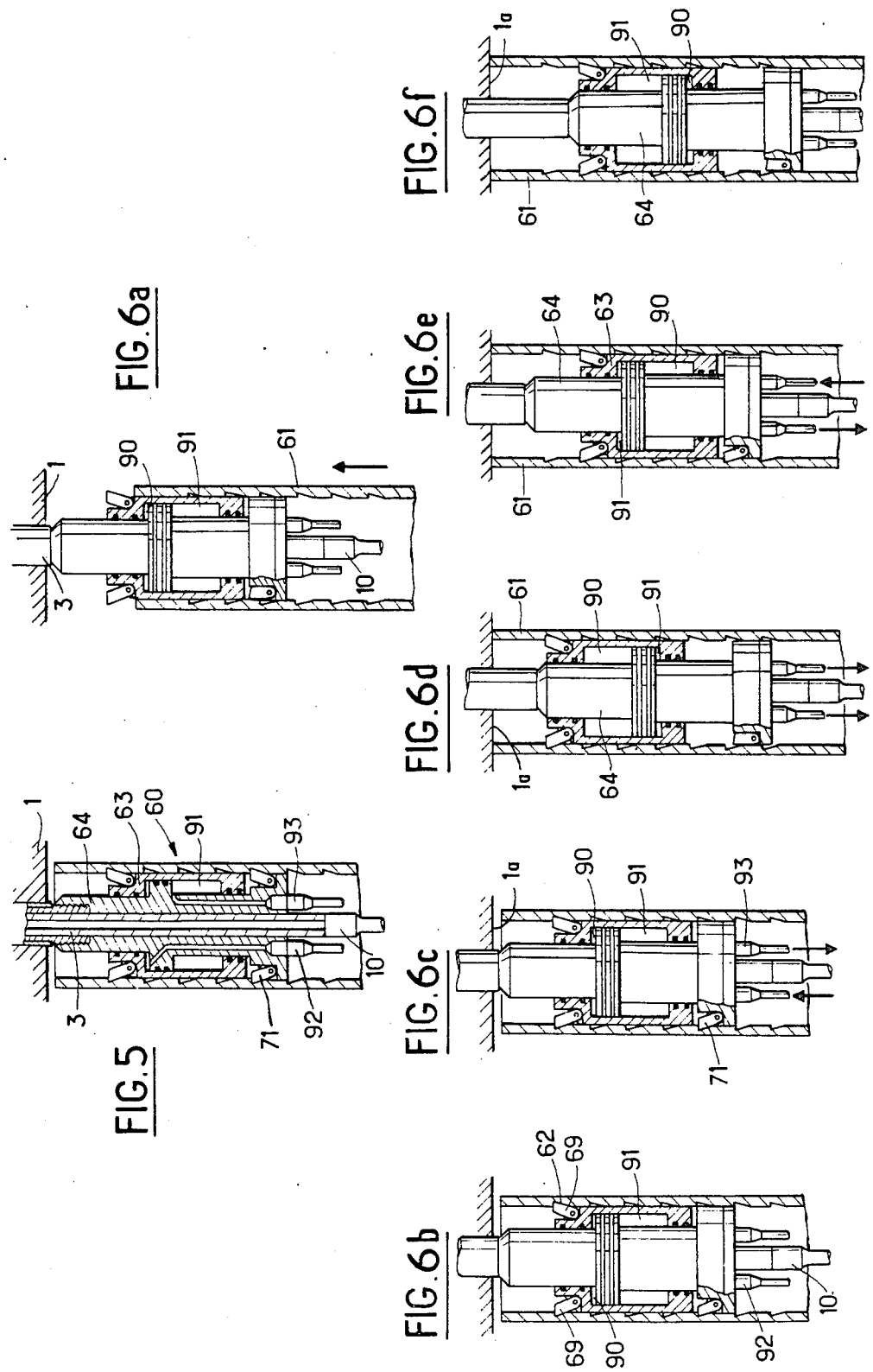

PROCESS FOR EXTRACTING A SECTION OF A HEAT-EXCHANGER TUBE

FIELD OF THE INVENTION

The invention relates to a process for extracting a section of an exchanger tube from a tube plate, especially in order to carry out an inspection of a zone of this tube.

BACKGROUND OF THE INVENTION

Heat exchangers, such as the steam generators of pressurized-water nuclear reactors, generally comprise a very thick tube plate, throughwhich pass tubes which are flush with one face of this tube plate forming its inlet face and which project on the other side of the tube plate, the outlet face of which is in contact with the interior of the steam generator receiving the feed water to be vaporized. The inlet face of the tube plate opens into the inner volume of a two-part water box, which ensures the distribution and recovery of the pressurized water circulating in the tubes and carrying the heating and vaporizing heat from the feed-water. Each of the tubes of the steam generator, curved round its upper part, has one end opening into one part of the water box and its other end opening into the other part of this water box.

The tubes of the steam generator, which form a bundle are crimped inside holes of suitable diameter which extend through the tube plate practically over the entire thickness of this plate. The crimping of the tubes in the tube plate involves rolling their wall against the wall of the holes in the plate, with a result that on the same side as the outlet face of the tube plate, in the wall of each of the tubes, there is a transition zone between the deformed part and the non-deformed part of the tube. The stresses in this transition zone of the tube are usually reduced by carrying out, after crimping, a slight diametral expansion of the tube in the transition zone. Nevertheless, a concentration of relatively high stresses still persists in this zone of the tube, which is consequently subjected to increased local corrosion, both from its inner surface in contact with the pressurized water and from its outer surface in contact with the feed water.

When maintenance is carried out on the steam generators of a shut down nuclear reactor, nuclear reactor, it is necessary to inspect the tubes, particularly in order to ascertain their corrosion resistance in the transition zone, after a certain period of operation. These inspections may require the extraction of a tube portion surrounding the transition zone.

Such extraction is useful only if it can be carried out without deformation or change in the surface condition of the tube, in the zone to be inspected.

There have been proposals for processes and devices which make it possible to extract a tube crimped in a tube plate either by wrenching it out mechanically or by contraction of the tube obtained by heating or by supercooling.

Where mechanical wrenching is concerned, the extractor produces lines and marks on the inner and outer surfaces of the tube, and as regards contraction by thermal means the tube experiences changes in the metallurgical phase and in the surface state. In both cases, the portion of the tube to be inspected has undergone a modification which makes the results of the appraisal doubtful.

French patent No. A-2,452,352 describes a device which makes it possible to extract the tubes by mechanical wrenching and which comprises a split bush and a knob to spread apart the various parts of the bush diametrically. This bush has teeth on its outer surface which dig into the inner part of the tube.

French patent No. A-2,220,326 describes an expansion device which is placed inside the tube and which comprises an assembly of elastic sleeves separated by rigid rings. An inner sliding core connected to the upper end sleeve causes the elastic sleeves to expand as result of axial displacement under the effect of a pull. This ensures that the device is attached, and a pull is subsequently exerted on it to wrench out the tube.

French patent No. A-2,491,249 describes a complex device which makes it possible to cut off and withdraw a steam-generator tube and divide it into sections. This device comprises a split bush provided with attachment teeth.

These devices of the prior art which ensure that the tube is wrenched out mechanically produce marks on the inner and outer surfaces of the tube and are generally of complex structure.

SUMMARY OF THE INVENTION

The object of the invention is, therefore, to provide a process for extracting a section of a heat-exchanger tube to be inspected from a tube plate in which the tube is fastened by crimping so that it is flush with one face of the tube plate and projects relative to the other face, the tube section to be extracted, previously separated from the rest of the tube by being cut off, having at least one zone where an inspection is carried out after extraction. The process can be carried out by means of a very simple device which is very easy to use and which makes it possible to recover a tube section in an unchanged state, at least in the zone to be inspected.

To achieve this result: a sleeve is introduced inside the tube from the face of the tube plate with which the tube is flush and over such a length that the sleeve covers the tube through the entire length of the tube plate and over the entire zone to be inspected, the tube and the sleeve are joined together in two zones located on either side of the zone to be inspected, by means of a binder which ensures a bond of high mechanical strength and which is introduced between the inner surface of the tube and the outer surface of the sleeve, and an axial pull is exerted on the sleeve from the face of the tube plate with which the tube is flush, in order to extract the tube section from the tube plate.

The invention also relates to a device of simple structure which makes it possible to carry out the process.

BRIEF DESCRIPTION OF THE DRAWINGS

In order tha the invention may be more clearly understood several embodiments of a device for performing the extraction process according to the invention, with regard to a tube of a steam generator of a pressurized-water nuclear reactor, will now be described by way of example, with reference to the accompanying drawings.

FIG. 5 view in axial section of an alternative embodiment of a pulling device.

FIGS. 6a, 6b, 6c, 6d, 6e and 6f are views in axial section of the pulling device illustrated in FIG. 5, in different positions during an operation to extract a tube.

DETAILED DESCRIPTION

Figure 1:
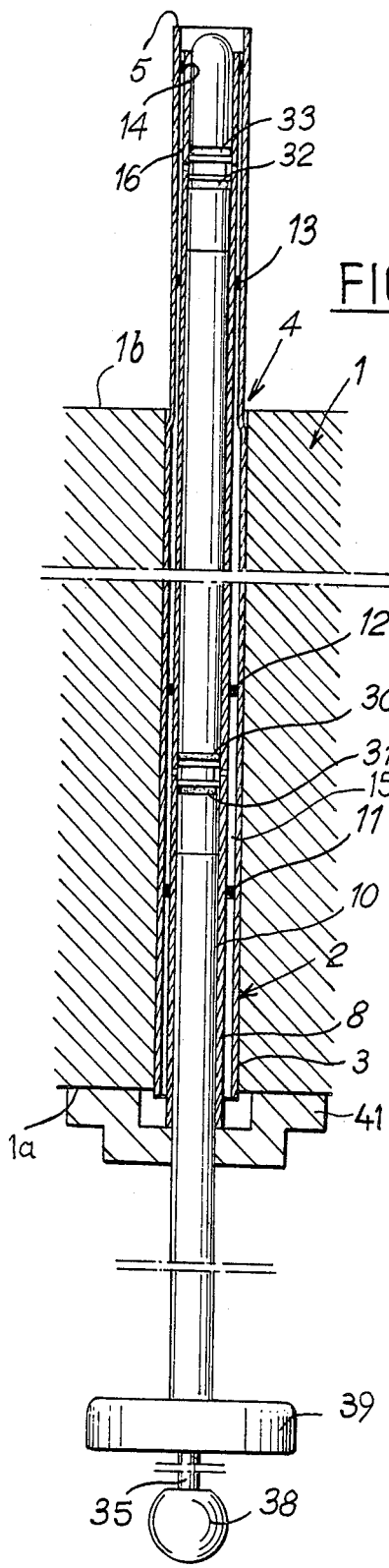
FIG. 1 is a view in axial section of the part of a steam generator tube passing through the tube plate, inside which a binder injection device making it possible to fasten a sleeve in the tube has been introduced.
Figure 1A:
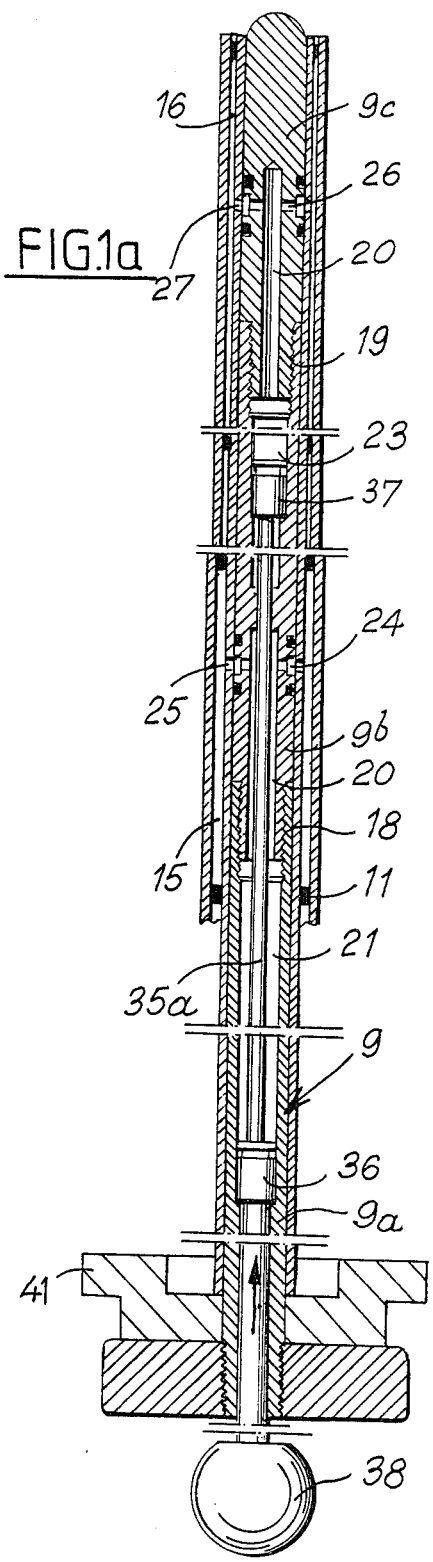
FIG. 1a is a view in axial section of the binder injection device.

FIGS. 1 and 1a show part of the tube plate 1 of a steam generator in the region of a hole 2 which passes right through it and which allows the passage of a tube 3. The tube 3 is fastened inside the hole 2 by means of crimping or expansion, its walls being rolled on the inside of the hole 2. The tube 3 is fastened in the hole 2 in such a way that its end is practically flush with the inlet face 1a of the tube plate. In contrast, the tube projects relative to the outlet face 1b of this plate. The transition zone 4 between the rolled part and the non-rolled part of the tube during the expansion operation is located in the vicinity of the outlet face 1b. Corrosion products can accumulate in this zone, and the concentration of stresses in the wall of the tube assists the corrosion.

After a certain period of operation of the steam generator, it may prove necessary to extract the tube 3 from the tube plate 1, particularly in order to examine the traces of corrosion in the transition zone 4.

During a shutdown for maintenance of the nuclear reactor, the lower part of the tube 3 shown in FIG. 1 is separated from the rest of the tube by being cut off at 5 from the inside of the tube by means of a tool of a known type which is introduced inside the tube via the water box of the steam generator located under the face 1a of the tube plate.

A first step of the process according to the invention involves fixing a sleeve 8, introduced into the tube, to the inner surface of this tube.

For that purpose, a binder injection unit 10, to be described later, is placed inside the sleeve 8, which is itself introduced inside the tube 3 from the face 1a of the tube plate with which the tube 3 is flush.

The sleeve 8 has an outside diameter a little less than the inside diameter of the tube 3 and a length substantially greater than the thickness of the tube plate 1.

As can be seen in FIGS. 1 and 1a, the sleeve 8 has annular receptacles which are located in its outer surface and into which are inserted gaskets 11, 12, 13 and 14. These gaskets have an outside diameter such that they ensure sealing between the outer surface of the sleeve 8 and the inner surface of the tube 3.

The gaskets 11 and 12, on the one hand, and the gaskets 13 and 14, on the other hand, are grouped according to the length of the sleeve 8, so as to delimit two closed annular zones 15, 16, of which one is located inside the tube plate 1 and the other a little above the face 1b of this tube plate, when the sleeve 8 and the injection device 10 are introduced into the tube 3, as shown in FIG. 1.

The injection device 10 consists of a body 9 in three parts 9a, 9b and 9c, the intermediate part 9b being fastened to the lower part 9a by means of a thread 18, and the upper part 9c being fastened to the intermediate part 9b by means of a thread 19.

The body 9 of the injection device has an axially directed central channel 20 comprising two parts 21 and 23 widened diametrically and forming injection chambers which are initially filled with a binder capable of ensuring that the sleeve 8 and the tube 3 are fixed to one another.

On the other hand, the intermediate part 9b of the body 9 of the injection device has radial perforations 24 over its entire thickness, which are arranged opposite perforations 25 passing through the wall of the sleeve 8 over its entire thickness. The channel 20 is thus put in communication with the annular space 15 when the device is fitted in the tube 3.

In the same way, the upper part 9c of the body 9 has radial perforations 26 over its entire thickness, which are arranged opposite perforations 27 passing through the thickness of the sleeve 8. The channel 20, in its upper part, is thus put in communication with the annular space 16 located between the gaskets 13 and 14.

Moreover, the intermediate part 9b of the body 9 is machined in the region of the perforations 24, in order to form an annular chamber which is closed on either side by means of gaskets 30 and 31, respectively.

In the same way, the upper part 9c of the body 9 is machined in the region of the radial perforations 26, in order to form an annular chamber closed on either side by means of annular gaskets 32 and 33, respectively.

An actuating rod 35 is mounted slideably inside the axially directed central channel 20 and has widened parts 36 and 37 arranged inside the injection chambers 21 and 23 respectively and connected by means of the central part 35a of the rod; these widened parts 36 and 37 have a diameter corresponding to the inside diameter of the chambers 21 and 23, so that these widened parts 36 and 37 form the injection pistons of a double syringe actuated by the rod 35.

An actuating knob 38 is fastened to the end of the rod 35 to make it possible to actuate this rod, thus allowing injection. A fastening disc 39 integral with the lower part of the syringe maks it possible to retain the latter in a stable fashion against the tube plate of the steam generator inside the water box, with a bearing piece 41 having a passage orifice for the injection device 10 being interposed. The bearing piece 41 and the disc 39 can be held against the tube plate either manually or by means of a handling arm.

The injection device 10 is engaged freely in the sleeve 8, and the retention of the disc 39 makes it possible to prevent it from rotating and permit the movements of the rod 35 to inject the binder.

When the injection device 10 and the sleeve 8 are in position in the tube 3, as shown in FIG. 1, the binder is injected into the annular spaces 15 and 18 by pushing the rod 35 upwards in the direction of the arrow 40. The pistons 36 and 37 then ensure that the binder is injected into the annular chambers located between the gaskets 30 and 31 on the one hand and 32 and 33 on the other hand through the radial perforations 24 and 26, then into the annular spaces 15 and 16 through the perforations 25 and 27 in the mandrel. The annular spaces 15 and 16 formed between the sleeve 8 and the inner surface of the tube 3 are of very small thickness, and the injected binder consists of a glue which sets as soon as it assumes the form of a layer of small thickness. The glue starts to set fairly quickly in the spaces 15 and 16, with the result that the injection device 10 has to be withdrawn fairly quickly to prevent it from being jammed inside the sleeve and tube. It is withdrawn by holding the bearing piece 41 against the tube plate and exerting a pull on the disc 39 integral with the injection device 10. It would also be possible to wait until the binder starts to set, so that the sleeve 8 is retained inside the tube 3 with a sufficient bonding force to make it possible to extract the device 10 out of this sleeve from the water box.

The final setting of the binder is then awaited in order to connect the lower end of the sleeve 8, projecting relative to the inlet face 1a of the tube plate, to an extractor making it possible to exert a sufficient pull to ensure the wrenching out of the tube.

Figure 2A:
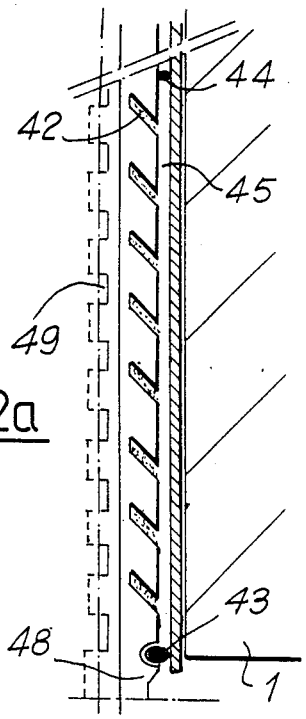
FIGS. 2a and 2b are views in axial section, showing a second embodiment of a device making it possible to join together a sleeve and a tube to be extracted.
Figure 2B:
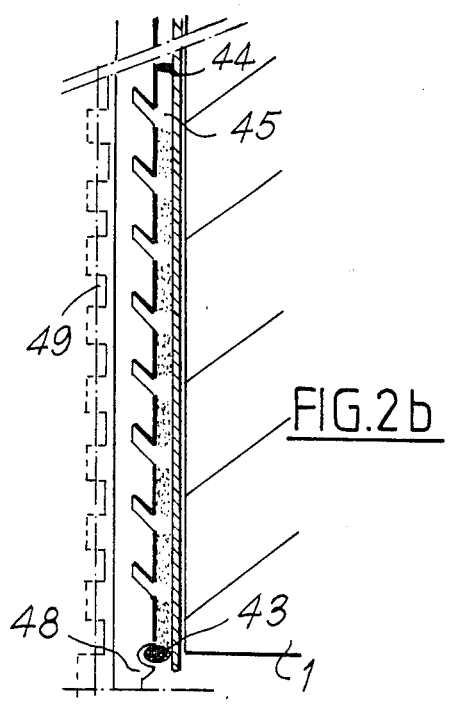

FIGS. 2a and 2b illustrate a second embodiment of the first step of the extraction process according to the invention.

A cylindrical piece 48 of a diameter a little less than the inside diameter of the tube 3 is introduced into the latter, with gaskets, such as 43 and 44, which delimit a closed annular space 45 between the piece 48 and the tube 3, being interposed.

It is clear that two zones, such as 45, are formed, as before, inside the tube 3, one within the tube plate 1, as illustrated in FIGS. 2a and 2b, and the other (not shown) in the projecting part of the tube 3 beyond the outlet face of the tube plate 1. As before, these two zones surround the transition zone of the tube 3 crimped in the tube plate 1.

The cylindrical piece 48 which performs the function of the sleeve 8 of the first embodiment has obliquely directed grooves 42 pointing downwards and filled with binder. A heating resistor 49 is arranged inside the piece 48 approximately in its axis.

When an electrical current is passed through the resistor 49, as result of the Joule effect this current generates sufficient heating of the piece 48 to cause the binder to melt and flow into the space 45. As a result of capillary action, the binder fills the various sections of the space 45 and solidifies in this space, ensuring a bond of high mechanical strength between the piece 48 and the tube 3.

A pull exerted on the piece 48 subsequently makes it possible to extract the tube 3 from the tube plate 1.

Figure 3A:
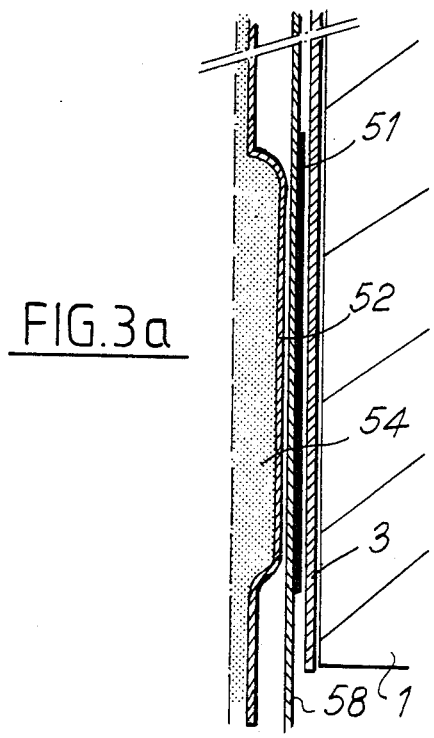
FIGS. 3a and 3b are views in axial section, showing a third embodiment of a device making it possible to join together a sleeve and a tube to be extracted.
Figure 3B:
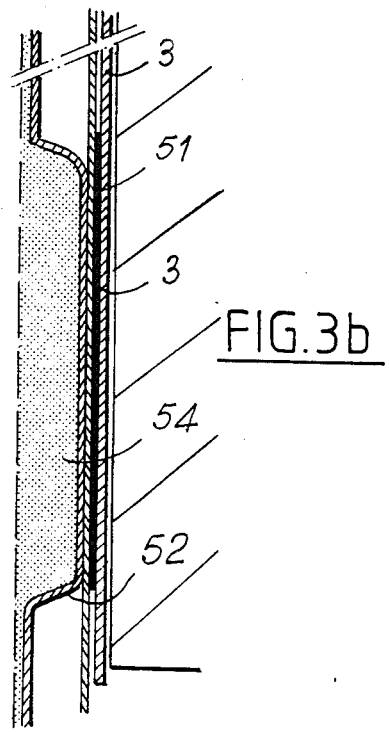

FIGS. 3a and 3b show a third embodiment of the first step of the process, involving fixing a sleeve 58 to the steam generator tube 3 passing through the tube plate 1.

The sleeve 58 having a thin layer of binder 51 is introduced into the tube 3 as before.

The sleeve 58 has a layer of binder 51 in two zones, of which one is positioned inside the tube plate and the other slightly above the outlet face of the tube plate within the tube 3. A flexible envelope 52 is introduced inside the sleeve 58; this envelope 52 has two bulges which are each positioned opposite a zone on the sleeve 58 having a layer of binder 51 on the outside, when the envelope 52 is positioned in the sleeve 58.

A fluid under pressure 54 is introduced into the envelope 52 which thus undergoes expansion in the region of each of the bulges. In this way, the sleeve 58 is laid against the tube 3 in each of the zones where it is covered with binder 51. This exertion of pressure on the binder produces a high-strength bond between the sleeve 58 and the tube 3.

As before, a pull on the sleeve 58 will make it possible to extract the tube.

It should be noted that, in all cases, the pull on the end of the sleeve is transmitted to the tube 3 in two zones located on either side of the transition zone 4 which is to be inspected after the tube has been extracted. Thus, this zone does not undergo any stress during extraction, the forces being transmitted to the tube via the sleeve on either side of the zone to be inspected. This produces a bridging effect which makes it possible to avoid any deformation of the zone where the inspection will be carried out.

Figure 4:
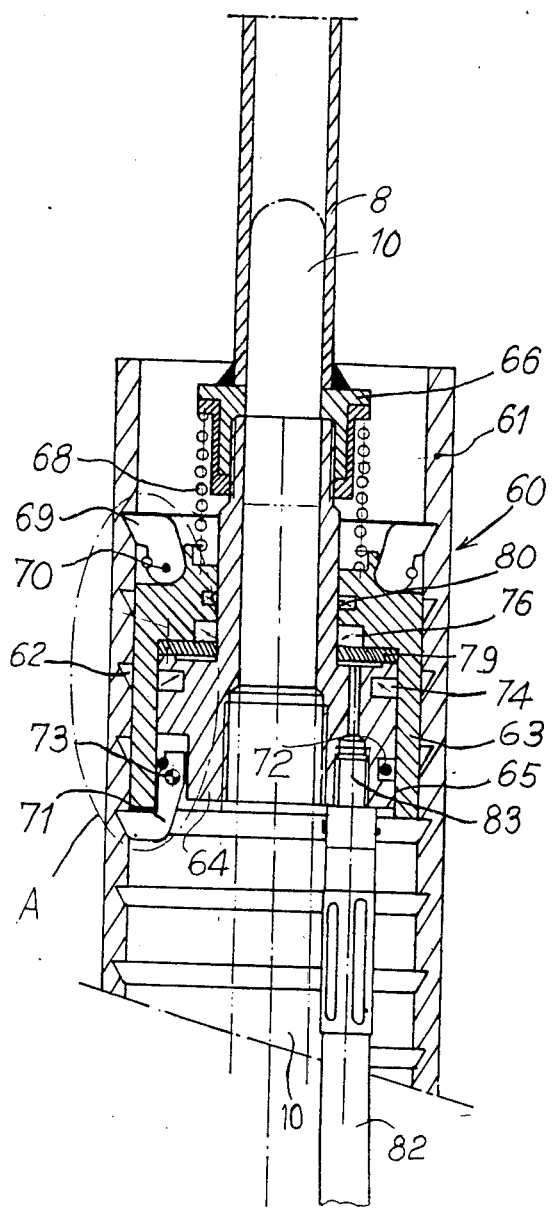
FIG. 4 a view in axial section of a device which makes it possible to exert a pull on a sleeve fixed to a steam generator tube.
Figure 4A:
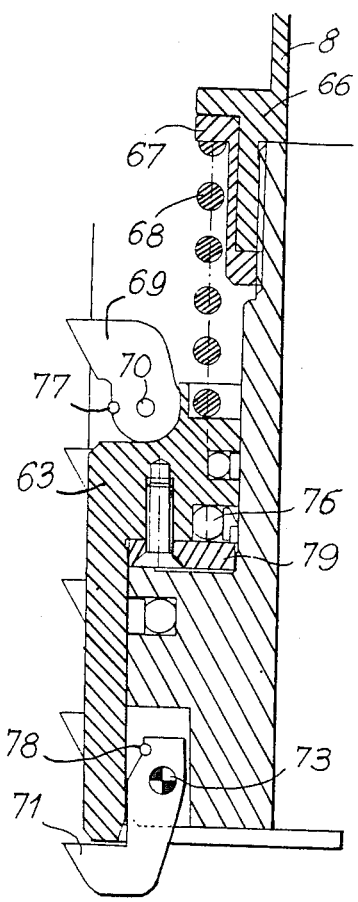
FIG. 4a is a view on a larger scale of the detail A in FIG. 4.

FIGS. 4 and 4a illustrate an extraction device designated in a general manner by the reference 60, which makes it possible to exert a pull on the sleeve 8, after the latter has been secured inside a tube passing through a tube plate, by means of a binder of high mechanical strength.

This extraction device has a cylindrical outer casing 61, in the inner wall of which grooves 62 have been machined at regular intervals in the axial direction. A body 63 is mounted inside the casing 61 and has a central bore 65 forming a chamber for the extraction piston 64 movable in the axial direction of the extractor. The piston 64 produced in tubular form is screwed, in its upper part, into a connecting piece 66, to which the sleeve 8 is welded. An annular piece 67 screwed on the end of the piston 64 serves as a bearing piece for a helical spring 68 which bears on the upper part of the body 63. Pawls 69 are mounted so as to be articulated about pins 70 on the body 63 in its upper part. The ends of each of the pawls 69 have a shape which allows them to engage in the grooves 62. Pawls 71 are likewise mounted so as to be articulated about pins 73 in the lower part of the piston 64. The pawls 71 likewise have a shape which allows them to engage in the grooves 62. Restoring springs 77 and 78 make it possible to exert a restoring force on the pawls 69 and 71, respectively, to make it possible for them to engage in the grooves 62.

A set of ring seals 74, 76 and 80 make it possible to ensure sealing between the bore in the body 63 and the piston 64. An elastomeric washer 79 retained in the body 63 by means of screws makes it possible to fit and retain the ring seal 76. The chamber of the piston 64 is supplied with hydraulic fluid by means of a flexible pipe 82 passing inside the cylindrical casing 61 and a channel 83 passing through the piston 64.

In FIG. 4, broken lines represent the binder injection device 10, such as that described with reference to FIGS. 1 and 1a, in the position in which it is introduced into or extracted from the sleeve 8 via the extractor device 60. By using this extractor device, it is therefore possible to introduce the sleeve 8 into the tube to be extracted, this sleeve 8 being integral with the extractor 60. The injection device 10, previously introduced into the sleeve 8, is then in place in order to make the bond between the sleeve and the tube. The device 10 is subsequently withdrawn. The extractor device 60 is used, as will be described later, for extracting the tube in steps after the final setting of the binder.

FIG. 5 shows an alternative embodiment of the extraction device 60 just described, the corresponding elements of the extraction devices illustrated in FIGS. 4 and 5 bearing the same references. The differences between the two devices are based solely on the fact that the lower pawls 71 mounted on the piston 64 have different shapes in the two embodiments, and that, in the second embodiment, the movement of the piston 64 is ensured in both directions by the admission of a hydraulic fluid under pressure. Consequently, the body 63 delimits, together with the piston 64, two chambers 90 and 91 which are respectively supplied with hydraulic fluid under pressure via pipes 92 and 93.

FIGS. 6a to 6f illustrate the device 60 according to the second embodiment in its various positions making it possible to extract a tube 3 from a tube plate 1.

The tube 3 has previously been cut off above the outlet face of the tube plate 1, and the sleeve 8 integral with the extractor 60 has been fixed to the tube 3 by means of a binder, bonding being ensured by a device 95 shown diagrammatically, which is introduced through the central bore in the device 60.

It is clear that the mode of operation which is going to be described in relation to the device illustrated in FIG. 5 can be transferred to the extraction device 60 shown in FIG. 4, the movement of the body 63 of which is ensured by the spring 68 and not by injecting a hydraulic fluid into the chamber 90 of the double-acting jack formed by the body 63 and the piston 64, as in the second embodiment.

FIG. 6a shows the device in the initial phase of extraction, in which the fitting of the outer casing 61 takes place. The chamber 91 is supplied with fluid under pressure, with a result that the body 63 and the piston 64 are maintained in their relative position indicated in the figure. The casing 61 slides as a result of the elastic mounting of the pawls, up to the moment when the upper pawls 69 engage in the upper groove 62 (FIG. 6b).

The chamber 91 of the jack is then connected to the atmosphere by means of the pipe 93, the chamber 90 then being supplied with hydraulic fluid via the pipe 92 (FIGS. 6c and 6d). The first result of this is that the cylindrical casing 61 is brought up against the lower face 1a of the tube plate and the various assembly plays of the device are absorbed.

The device is then completely rigid and effects the extraction of the tube 3 by pulling on the sleeve 8, as shown in FIG. 6d. Bearing on the tube plate is then ensured by the upper pawls 69 and the casing 61.

The piston 64 moves one step, thereby extracting the tube 3 over the corresponding length.

The directions of supply of the chambers 90 and 91 are then reversed, the chamber 90 being supplied with hydraulic fluid and the chamber 91 being connected to the atmosphere (FIG. 6e).

During the downstroke of the piston 64 to extract the tube, the lower pawls 71 had disengaged from the corresponding groove 62 in order to take up position in the groove located one step below. Consequently, the supply of the chamber 90 does not allow the upstroke of the piston 64 which is locked in position relative to the casing 61. The body 63 is therefore moved downwards over a distance of one step, with a result that its pawls 69 engage into the second groove 62 of the casing 61, from the top.

The direction of supply of the chambers 90 and 91 is then reversed, and the casing 61 comes up against the face 1a of the tube plate. The device is then ready for a second extraction step, as can be seen in FIG. 6f. Extraction thus continues step by step, until the entire tube 3 has been recovered. It should be noted that, during the extraction of the tube, the pull exerted on the sleeve is transmitted to the tube according to the two zones where the bond is made, on either side of the transition zone of the tube 3. This prevents, by means of a bridging effect, any deformation of the zone of the tube to be inspected.

It therefore emerges that the process and device according to the invention, because of their great simplicity of use, make it possible to ensure the extraction of the tube by means of a simple and highly reliable operation. eration.

It is possible to conceive the use of any binder to make the bond between the sleeve and the tube, but this binder preferably consists of a glue, such as an anaerobic glue which sets as soon as it is isolated from the oxidizing outer atmosphere, for example when the pieces to be joined together are brought into intimate contact with one another. It is of course possible to use other types of glue which set as a result of an increase or decrease in temperature, where hot-melt glue is concerned, or an increase in pressure, or even as a result of the formation of a thin layer between the pieces to be joined together.

It is also clear that the way in which the binder is used and setting is obtained can differ from that described. In particular, the binder can be both introduced between the sleeve and the tube by means of injection and be coated on the outer surface of the sleeve before the sleeve is introduced into the tube.

The sleeve can be replaced by a solid cylinder, if the binder is coated on the outer surface beforehand.

It will be noted, however, that a preferred embodiment entails the use of a hollow sleeve having an inside diameter which, after it has been installed, is sufficient to ensure the passage of tools intended to act on the tube beyond its upper end.

The extractor can be installed and fixed to the sleeve after it has been connected to the tube, or, on the contrary, can be fastened beforehand to the sleeve which is subsequently fixed to the tube. If a binder is injected, this injection can be carried out by means of a device other than a syringe such as that described.

The extractor can be of any type actuated by mechanical or hydraulic means; it can carry out extraction in steps or continuously instead.

Finally, the process and device according to the invention are used not only for extracting steam generator tubes of a pressurized-water nuclear reactor, but also for extracting any tube from a heat exchanger having a tube plate, for the purpose of inspecting a portion of such tube.

What is claimed is:

1. Process for extracting a heat-exchanger tube section (3) to be inspected from a tube plate (1) in which the tube is fastened by crimping so that is is flush with one face (1a) of the tube plate and projects relative to the other face (1b), the tube section(3) to be extracted, previously separated from the rest of the tube by being cut off, having at least one zone (4) where an inspection is carried out after extraction, comprising :

introducing a sleeve (8) inside the tube (3) from the face (1a) of the tube plate with which the tube (3) is flush and over such a length that the sleeve (8) covers the tube (3) through the entire length of the tube plate (1) and over the entire zone (4) to be inspected, joining the tube (3) and the sleeve (8) together in two zones (15, 16) located on either side of the zone (4) to be inspected, by means of a binder which ensures a bond of high mechanical strength and which is introduced between the inner surface of the tube (3) and the outer surface of the sleeve (8), and exerting an axial pull on the sleeve (8) from the face (1a) of the tube plate (1) with which the tube (3) is flush, in order to extract the tube section (3) from the tube plate (1).

2. Extraction process according to claim 1, comprising:
injecting the binder, after been introduced into the tube (3), into the two zones (15, 16) between the inner surface of the tube (3) and the outer surface of the sleeve (8).
and extracting the tube (3) by pulling on the tube (8) after the time required for the binder to set.

3. Extraction process according to claim 2, comprising:
introducing into the sleeve (8) a binder injection device (10)
positionning the sleeve (8) in the tube (3)
injecting the binder by means of the injection device (10)
extracting the injection device (10) from the sleeve (8) after the binder has started to set
and extracting the tube subsequently after the binder has set finally.

4. Extraction process according to claim 1, wherein the binder is a glue, such as an anaerobic glue.

5. Extraction process according to claim 1, wherein the binder is coated on the outer surface of the sleeve (8) before the latter is introduced into the tube (3).

6. Extraction process according to claim 5, wherein the binder is arranged in cavities (42) formed in the outer surface of the sleeve (48), and this binder is introduced between the tube (3) and the sleeve (48) as a result of the heating of this sleeve (48).

7. Extraction process according to claim 5, wherein the binder is applied between the sleeve (58) and the tube (3) by means of a pressure exerted on the sleeve (58) from the inside.

* * * * *

UNITED STATES PATENT AND TRADEMARK OFFICE
CERTIFICATE OF CORRECTION

PATENT NO. : 4,776,072

DATED : October 11, 1988

INVENTOR(S) : JACQUIER ET AL.

It is certified that error appears in the above-identified patent and that said Letters Patent is hereby corrected as shown below:

Column 9, line 7, claim 2, after "after" insert the words --the sleeve 8 has--.

Signed and Sealed this

Seventh Day of August, 1990

Attest:

HARRY F. MANBECK, JR.

*Attesting Officer*      *Commissioner of Patents and Trademarks*